United States Patent [19]
Cornelius

[11] 4,067,497
[45] Jan. 10, 1978

[54] SPEED GOVERNOR FOR IRRIGATION SYSTEM

[75] Inventor: Gail Cornelius, Portland, Oreg.

[73] Assignee: R. M. Wade & Co., Portland, Oreg.

[21] Appl. No.: 700,226

[22] Filed: June 28, 1976

[51] Int. Cl.² ............................................. B05B 3/00
[52] U.S. Cl. ..................................... 239/177; 239/212
[58] Field of Search .................. 239/177, 212; 137/53, 137/344

[56] References Cited

U.S. PATENT DOCUMENTS

| | | | |
|---|---|---|---|
| 2,816,749 | 12/1957 | Oberle | 137/53 X |
| 3,233,832 | 2/1966 | Hallberg | 137/53 X |
| 3,409,033 | 11/1968 | Johnston | 137/53 X |
| 3,484,046 | 12/1969 | Harris | 239/212 X |
| 3,795,365 | 3/1974 | Cornelius | 239/212 |

Primary Examiner—Richard A. Schacher
Attorney, Agent, or Firm—Phillips, Moore, Weissenberger, Lempio & Majestic

[57] ABSTRACT

In a system including, for example, an irrigation line supported by towers and rotatable about a central pivot, one tower thereof, for example, the outermost tower, includes a governor system for providing that increased water flow is provided to the water motor driving that tower as that tower is driven up a grade, and decreased water flow is provided to the water motor driving that tower as that tower is driven down a grade, as compared to the water flow to such water motor as the tower is driven over generally level ground.

11 Claims, 9 Drawing Figures

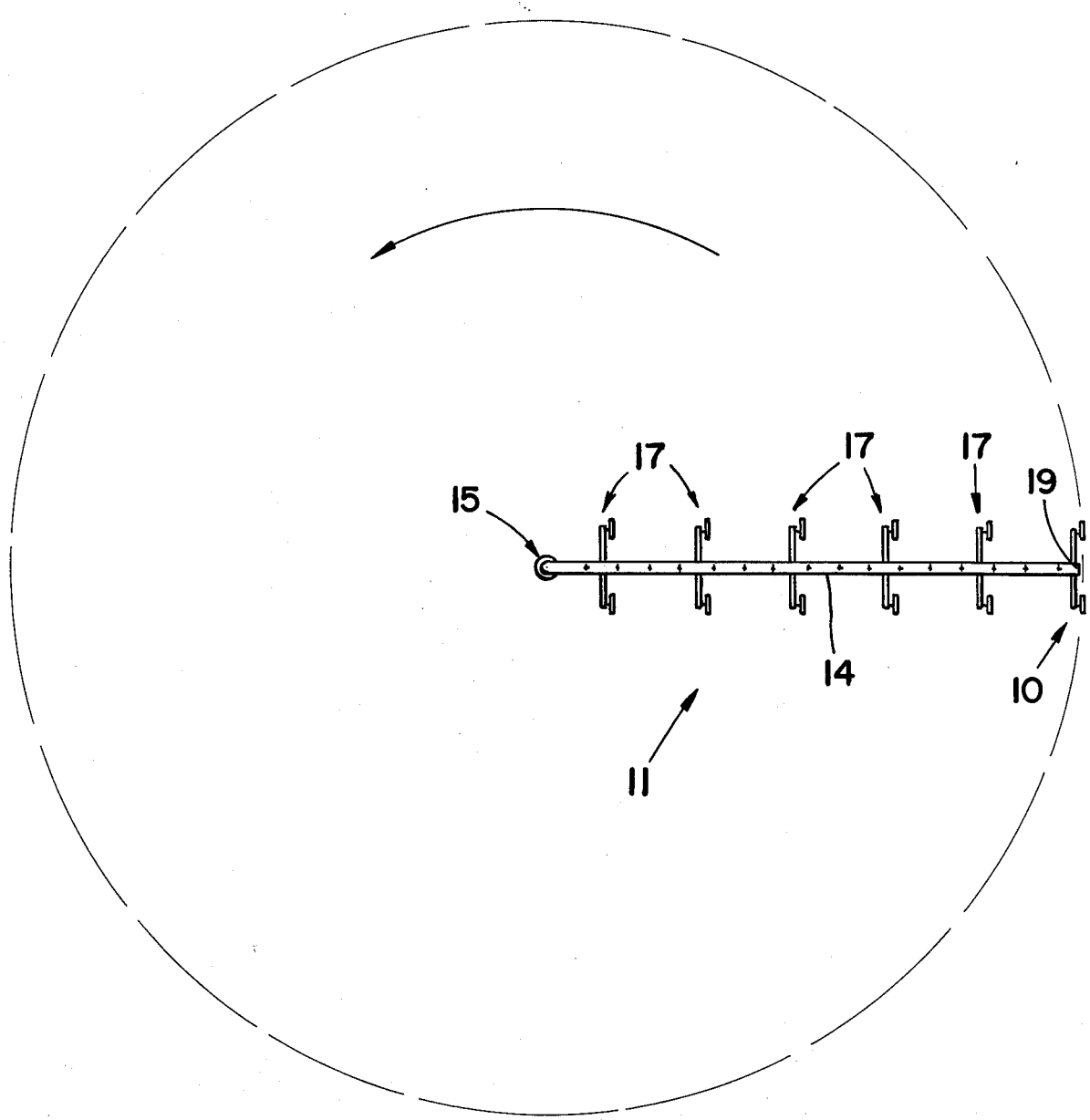
FIG_1

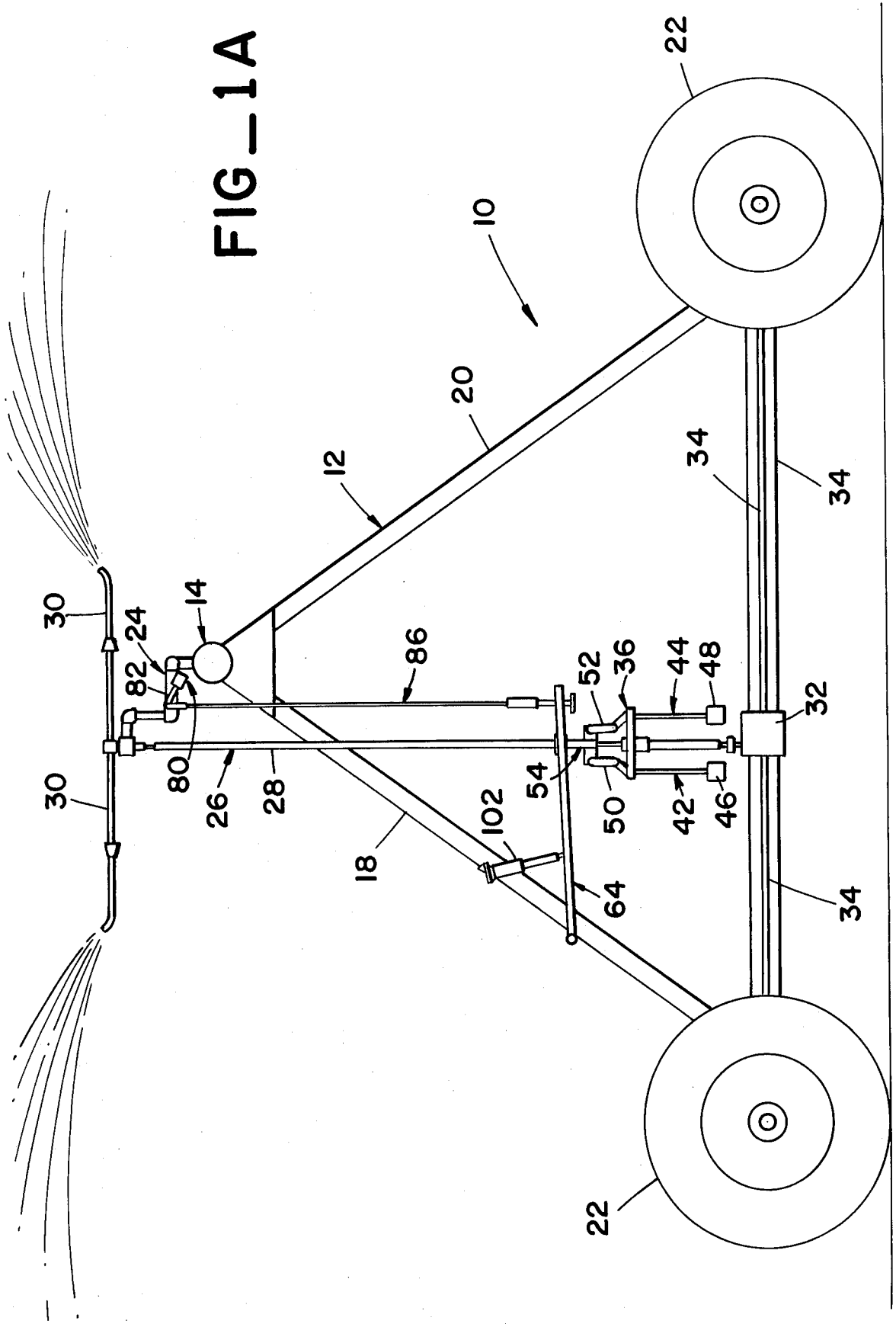

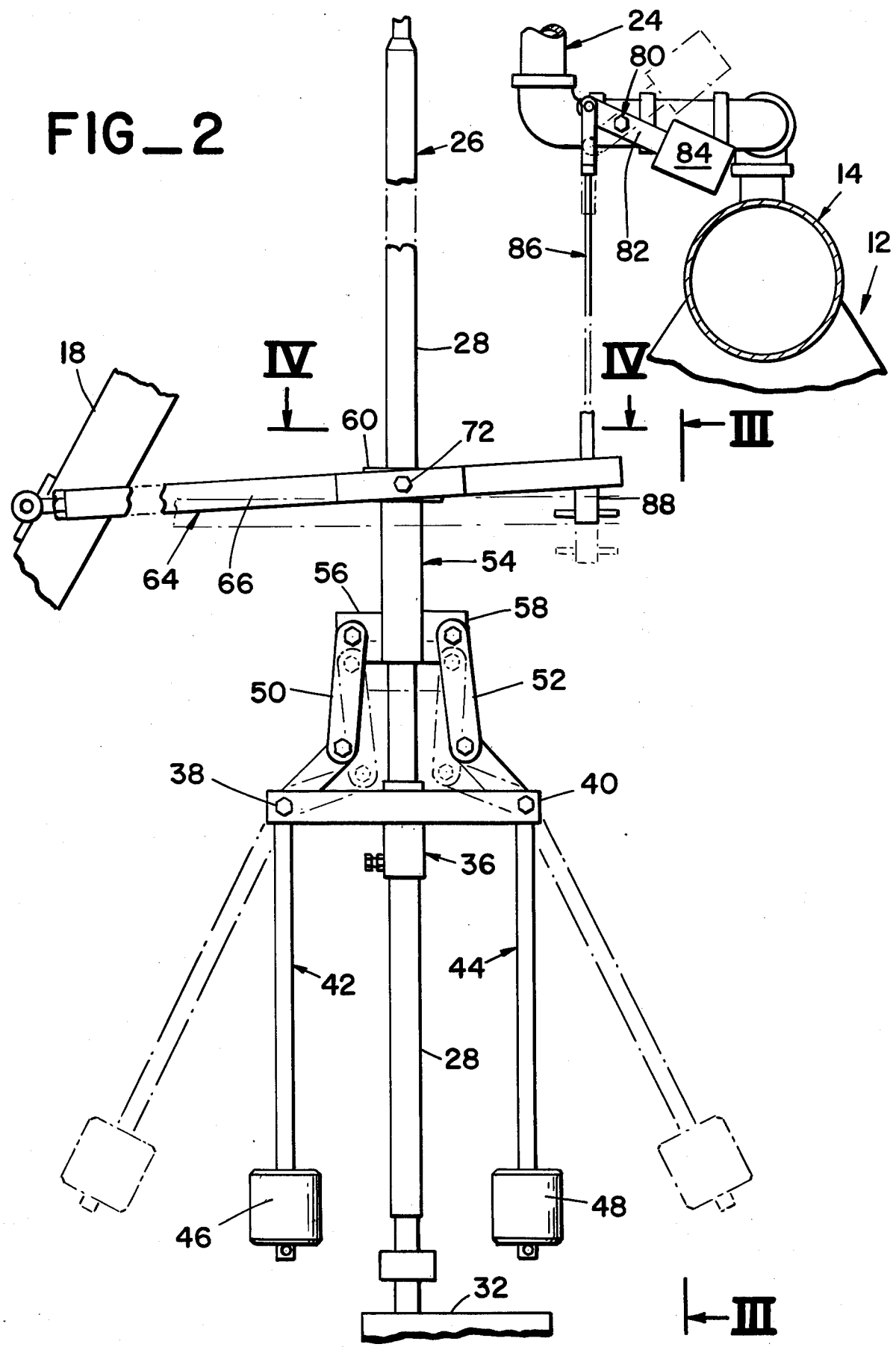
FIG_2

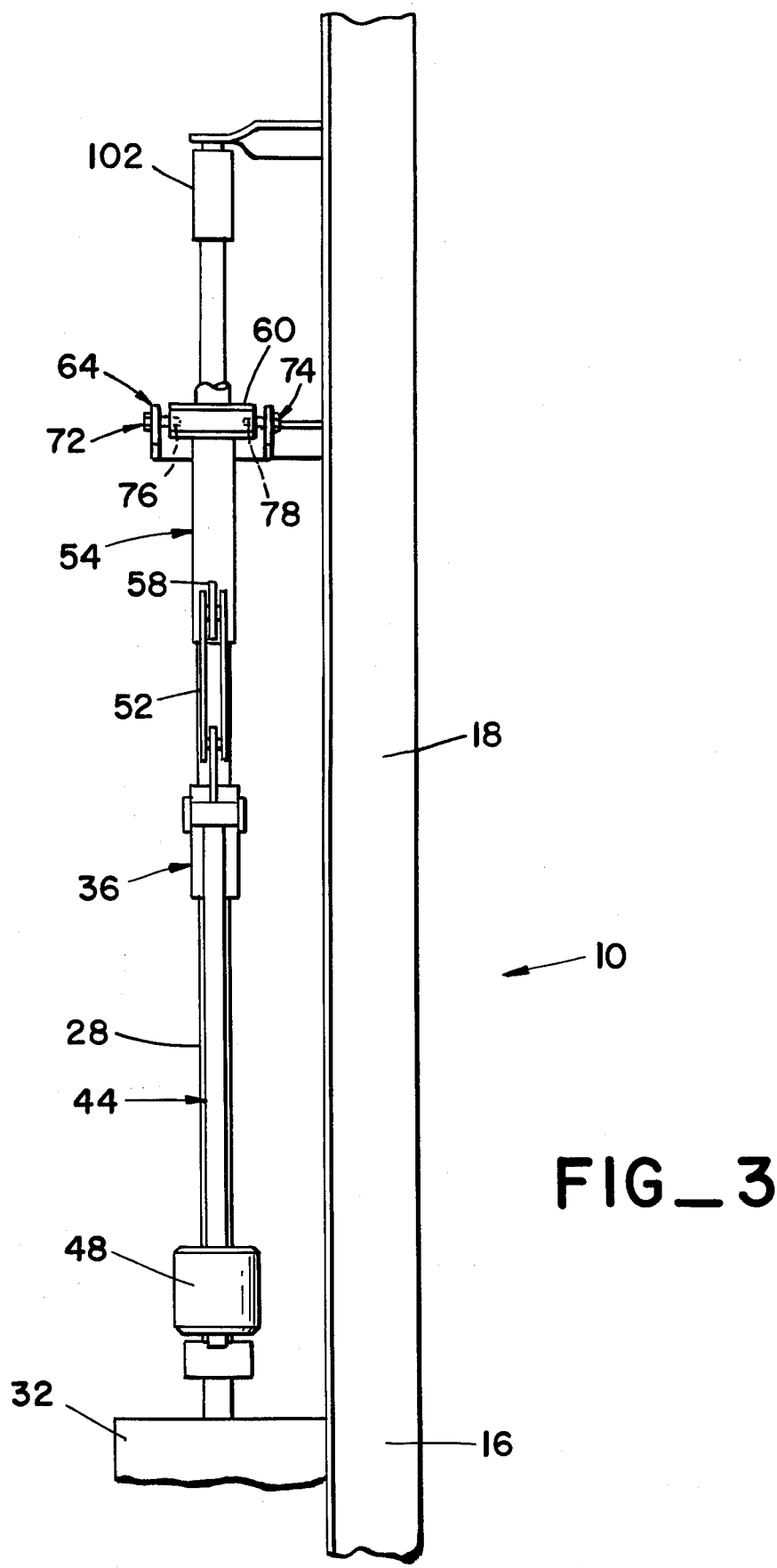
FIG_3

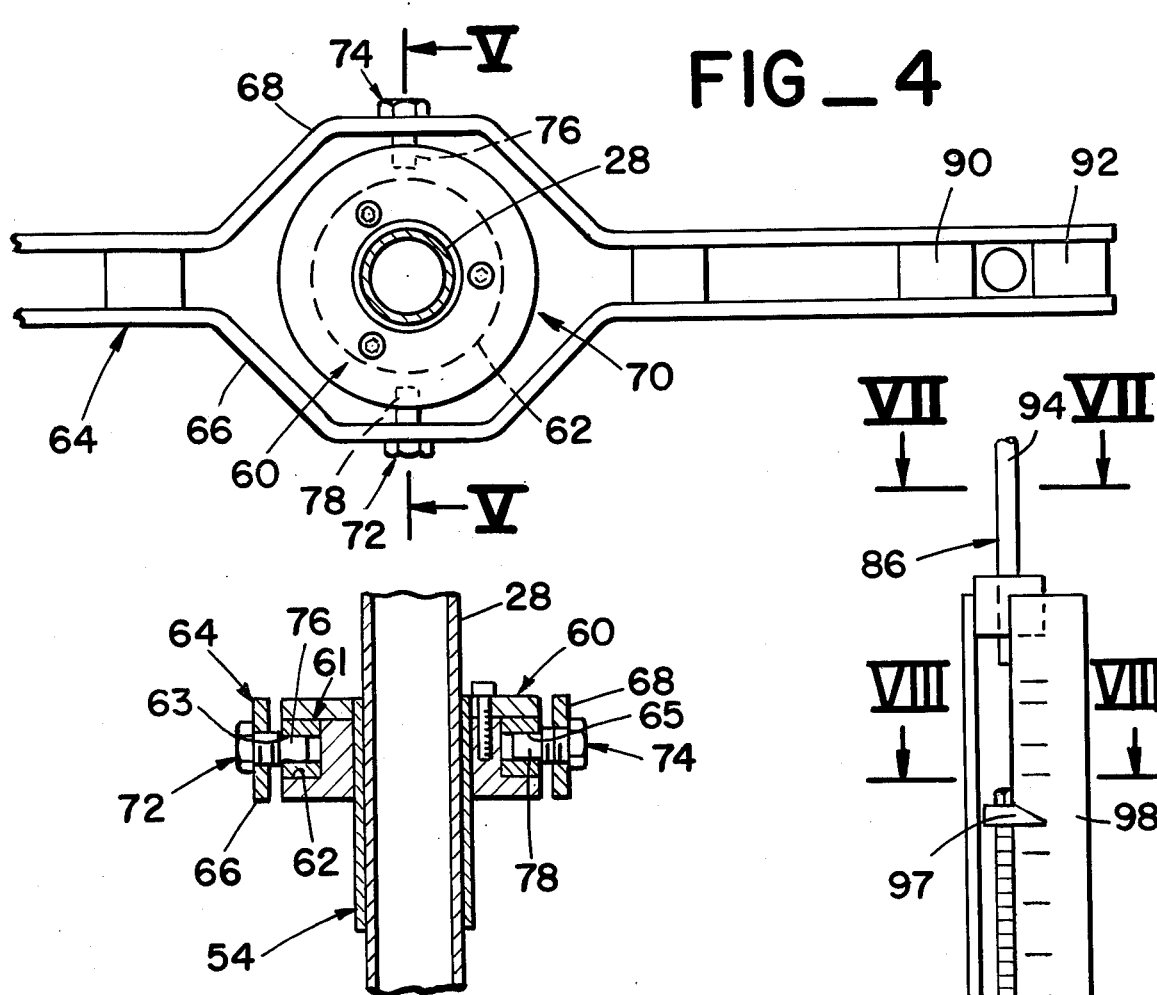

SPEED GOVERNOR FOR IRRIGATION SYSTEM

BACKGROUND OF THE INVENTION

This invention relates to drive apparatus for an irrigation line, and more particularly, to a drive apparatus including governor means for providing proper driving of the irrigation line over uneven terrain.

In, for example, a rotary-type irrigation system, an elongated irrigation line is supported at intervals by towers on wheels and water is supplied from the irrigation line to individual water motors associated with the towers to drive them over the ground, the entire irrigation line rotating about a central pivot axis. Generally, the outermost tower is provided with a valve so as to supply water of a certain pressure to the outermost drive motor, and means are included adjacent each tower for providing proper operation of each other water motor so that the irrigation line stays substantially in alignment as it rotates. With constant water pressure being applied to the outermost water motor, the entire irrigation line will be transported at a substantially constant speed over level ground. However, as the line is driven up a grade, the torque applied to the outermost water motor remains the same but with the necessity of such torque not only driving that portion of the irrigation line over the ground, but actually lifting it up the grade. Likewise, as the line is driven down a grade, the torque applied to the outermost water motor remains the same.

It will be understood that the overall speed of the outermost tower, and thus, the overall rotative speed of the irrigation line, changes substantially during either of these conditions. Yet the overall amount of water flowing from the irrigation line to irrigate the ground remains constant for a given period of time. This is a highly undesirable state since it will be seen that the uphill ground will be much more heavily irrigated, and downhill ground will be much more lightly irrigated than level ground being irrigated, when it is to be understood that substantially constant and even irrigation throughout the entire rotative cycle of the irrigation line is highly desirable.

SUMMARY OF THE INVENTION

It is accordingly an object of this invention to provide a drive apparatus for an irrigation line which compensates for unevenness in terrain to be irrigated so as to insure substantially even irrigation of the land.

It is a further object of this invention to provide drive apparatus which, while fulfilling the above object, is extremely simple in design and efficient in use.

Broadly stated, the invention comprises a drive apparatus for a pivot irrigation line comprising frame means on which an irrigation line is supported, and rotatable support means mounted to said frame means and on which the frame means are supported with the rotatable support means on the ground. Motor means are operatively coupled with said rotatable support means to apply driving torque to said rotatable support means. Means are included for providing a motor drive torque to rotate the rotatable support means to drive said frame means over generally level ground. Means are included for varying motor drive torque to maintain a generally constant speed of rotation of the rotatable support means as the frame means is driven up or down a grade.

BRIEF DESCRIPTION OF THE DRAWINGS

These and other objects of the invention will become apparent from a study of the following specification and drawings, in which:

FIG. 1 is a plan view of a pivot irrigation apparatus incorporating the invention;

FIG. 1A is an overall side elevation of apparatus incorporating the invention;

FIG. 2 is an enlarged view of portions of the apparatus as shown in FIG. 1A;

FIG. 3 is a view taken along the lines 3—3 of FIG. 2;

FIG. 4 is a view taken along the lines 4—4 of FIG. 3;

FIG. 5 is a sectional view taken along the lines 5—5 of FIG. 4;

FIG. 6 is an enlarged view of a portion of the apparatus as shown in FIG. 2;

FIG. 7 is a view taken along the lines 7—7 of FIG. 6; and

FIG. 8 is a view taken along the lines 8—8 of FIG. 6.

DESCRIPTION OF THE PREFERRED EMBODIMENT

Generally shown in FIG. 1 is an irrigation system 11 of the pivot type, including a line 14, an end 15 of which is pivotally secured relative to the ground. The line 14 is supported by tower 17 positioned at spaced intervals along its length, and an end tower 10 in association with the extended end 19 of the line 13.

Generally shown in FIG. 1A is the tower 10 including frame means 12 on which the irrigation line 14 is supported generally transversely thereof. The frame means 12 include a lower frame member 16, and upwardly and inwardly extending frame members 18,20 forming an overall triangulated structure. The lower frame member 16 has rollingly fixed thereto rotatable support means in the form of wheels 22.

In such a system, it is well known to provide that the irrigation line 14 is made up of a plurality of individual sections with each tower including water motor means for driving the wheels which support that tower. In order to maintain the line 14 in an aligned condition, it is known to actuate and deactuate appropriate water motors upon a certain bending of the line 14 taking place, through, for example, a linkage system interconnecting two sections of line.

The particular drive system of the outermost or end tower 10 is shown in FIG. 1A. As shown therein, and also in FIGS. 2 and 3, water under pressure is supplied from the irrigation line 14 through conduit means 24 to rotary means 26, including a vertically disposed shaft 28, and tubular arms 30 fixed thereto, through which the water may exit. It will be seen that water supply from the line 14 through the conduit 24 and exiting from the ends of the arms 30 tends to turn the shaft 28 about its longitudinal axis. The bottom portion of the shaft 28 connects with a gear box 32, through which are driven forwardly and rearwardly extending shafts 34, in driving engagement with the respective wheels 22. Through such water motor means, driving torque is applied to the wheels 22, to drive the tower 10.

Fixed to the lower end of the elongated shaft 28 is a generally T-shaped member 36. The extended ends 38,40 of the T-shaped member 36 have pivotally secured thereto links 42,44, the lower ends of the links 42,44 having weights 46,48 secured thereto. The upper ends of the links 42,44 have pivotally secured thereto respective links 50,52. A collar 54 is slidably mounted on the shaft 28, and has flanges 56,58 extending from opposite sides thereof to which are pivotally mounted the upper ends of links 50,52. Referring to FIGS. 4 and 5, secured to the collar 54 are disc means 60 having bearing surfaces defining an annular channel 62 thereabout. A ring 61 is slidably disposed in the channel 62, and defines bores 63,65 on the opposite sides thereof. A bar 64 is pivotally mounted to the frame member 18, being made up of spaced plates 66,68 defining an enlarged opening 70 which extends about the disc means 60. The plates 66,68 have bolts 72,74 respectively secured thereto with the inner ends 76,78 thereof extending inwardly thereof. The inner ends 76,78 thereof are smooth in configuration and fit within the bores 63,65 as shown in FIG. 5. A valve 80 is disposed in the conduit 24 and is relatively openable and closeable upon movement of lever 82 to provide relative increase and decrease in water flow to rotate the shaft 28. The relatively more open position is shown in full in FIG. 2 and the relatively more closed position is shown in phantom in such FIG. 2.

A weight 84 secured to the valve lever 82 tends to hold the valve 80 in the relatively open position thereof. The end of the valve lever 82 extending oppositely from the weight has pivotally secured thereto an elongated member 86, the lower end of which defines a widened portion 88 on which rest crossbars 90,92 extending between the plates 66,68 of the bar 64. The elongated member 86 actually is made up of a main portion 94, a second or lower portion 96, and a member 98 interconnecting the two, the lower portion 96 being threadably engaged with the member 98, and the main portion 94 being secured relative to the adjustment member 98 by means of a setscrew 100.

The lower portion 96 has rotatably fixed thereto an indicator member 97 the position of which can readily be ascertained relative to scale markings on the member 98. Rotation of the portion 96 relative to member 98 changes this relative positioning, also changing the overall length of the member 86.

It will be seen that upon increase in rotational speed of the shaft 28, the weights 46,48 extend outwardly so as to slide the collar 54 in one direction downwardly along the shaft 28. Similarly, upon decrease of rotational speed of the shaft 28, the collar 54 will slide in the other, upward direction along the shaft 28. During such downward movement of the collar 54, the bar 64 is pivoted downwardly in one direction, and during movement of the collar 54 in the other, upward direction, the bar 64 pivots in the other, upward direction. Downward movement of the bar 64 due to the sliding movement of the collar 54 downwardly closes the valve 80 through movement of the elongated member 86, and movement of the bar 64 upwardly provides relative opening of the valve 80.

A shock damper 102 interconnects the bar 64 and frame member 18 for controlling pivoting movement of the bar 64 relative to the frame 12 during the operation of the apparatus, as will now be described.

Initially, water under pressure is supplied to the irrigation line 14, to rotate the rotary means 26 as above described. The valve 80 is in its relatively open position, supplying full flow to rotate the means 26. As the speed of the rotary means 26 increase, the weights 46,48 extend outwardly, moving the collar 54 and bar 64 downwardly to tend to close the valve 80, but with the valve 80 never reaching a fully closed condition. Assuming that the tower 10 is moving over generally level ground, a balanced state will be achieved wherein a generally even level of motor drive torque is applied to the wheels 22 to drive the tower 10 over the generally level ground. Overall length of the member 86 is chosen by the adjustment described above, to in turn determine the maximum extent of opening of the valve 80, in turn determining maximum speed of the motor wheel is available.

Assuming that the tower 10 is then made to move up a grade, varying the load condition, the motor drive torque supplied to drive the wheels 22 is, initially, substantially the same, but is, of course, insufficient to maintain a drive speed of the tower 10 equal to the previous drive speed, since the tower 10 and portion of the irrigation line 14 must be lifted as well as driven over the ground. In such case, the rotary means 26 slows down, and the weights 46,48 move inwardly, acting as governor means which sense the decrease of rotational speed of the rotary means 26. The inward movement of the weights 46,48 slides the collar 54 upwardly along the shaft 28 causing the valve 80 to relatively open to provide an increase in water flow to the rotary shaft 28. Such increase in water flow provides that as the tower 10 is driven up the grade, the motor drive torque applied to drive the wheels of such tower 10 is greater than the motor drive torque which drives the tower 10 over generally level ground. This is done, of course, through increased water flow to the rotary means 26. Thus, the speed of the tower 10 picks up on the grade for more even distribution of irrigating water, the end result being that the rotational speed of the wheels 22, remains generally constant, i.e., generally equal to the rotational speed thereof over level ground.

Upon the tower 10 reaching downhill ground, varying the load condition, the increased supply of water supplied to the rotary means 26 will rotate the shaft 28 faster than desirable, so that the governor means sense the increase in rotational speed of the shaft 28, to in turn relatively close the valve 80 to provide a decreased water flow to the rotary means 26. This in turn provides relatively less motor drive torque, so that the wheels 22 continue to be driven at such generally constant speed.

The overall, steady-state rotational speed of the line 14 can be determined by appropriate adjustment of the length of the member 86, and the markings on the member 98 can be chosen in, for example, time of one complete rotation of the line 14.

It is also to be noted that upon a decrease in supply pressure to the line 14, the rotative speed of the shaft 28 decreases. The weights 46,48 move inwardly opening the valve to increase water flow to the rotary shaft 28, to in turn pick up the speed of the line 14. Likewise, an increase in supply pressure causes the valve to close to an extent, slowing the line from its too-rapid state due to such excessive supply pressure.

What is claimed is:

1. A drive apparatus for a pivot irrigation line comprising:
   frame means on which an irrigation line is supported;
   rotatable support means mounted to said frame means and on which the frame means are supported with the rotatable support means on the ground;
   motor means operatively coupled with said rotatable support means to apply driving torque to said rotatable support means;
   means for providing a motor drive torque to rotate said rotatable support means to drive said frame means over generally level ground; and means for varying motor drive torque to maintain a generally constant speed of rotation of the rotatable support means as the frame means is driven over a variation in grade.

2. The apparatus of claim 1 wherein the motor means comprise water motor means comprising rotary means rotatable to provide motor drive torque upon supply of flowing water thereto, increased water flow providing relatively greater motor drive torque and decreased water flow providing relatively lesser motor drive torque.

3. The apparatus of claim 2 wherein the means for varying motor drive torque comprise; valve means operatively connected with said rotary means and relatively openable to provide an increase of water flow to said rotary means, and relatively closeable to provide a decrease in water flow to said rotary means;
governor means rotatable with the rotary means to sense a decrease or an increase in rotational speed of the rotary means; and
means operatively coupling the governor means and valve means for providing that upon sensing of the decrease or increase in rotational speed of the rotary member by the governor means, the valve means is relatively opened or closed respectively to provide a respective increase or decrease in water flow to said rotary means.

4. The apparatus of claim 3 wherein the governor means comprise a plurality of weights movable inwardly and outwardly of the shaft upon decrease and increase or rotational speed of the rotary means.

5. The apparatus of claim 4 wherein the rotary means comprise an elongated shaft rotatable about its longitudinal axis, and wherein the means operatively coupling the governor means and valve means comprise a collar operatively coupled with governor means and slidably disposed on said shaft, said collar being slidable in one direction along the shaft upon increase in rotational speed of the shaft, and slidable in the other direction along the shaft upon decrease of rotational speed of the shaft, and link means operatively interconnecting said collar and valve means for providing that sliding movement of the collar along the shaft in one direction relatively closes the valve means, and sliding movement of said collar in said other direction relatively opens said valve means.

6. The apparatus of claim 5 wherein the link means comprise a bar pivotally mounted relative to the frame means so as to be pivotable relative thereto in one direction upon movement of the collar in said one direction, and pivotable in the other direction upon movement of the collar in the other direction, and an elongated member operatively coupling the bar and valve means for providing that pivoting of the bar in said one direction provides relative closing of the valve means, and pivoting of the bar in the other direction provides relative opening of the valve means.

7. The apparatus of claim 6 and further comprising shock damper means operatively interconnecting the bar and frame means for controlling pivoting movement of the bar relative to the frame means.

8. A drive apparatus for an irrigation apparatus comprising:
frame means on which an irrigation line is supported;
rotatable support means mounted to said frame means and on which the frame means are supported with the rotatable support means on the ground;
motor means operatively coupled with said rotatable support means to apply driving torque to said rotatable support means;
means for providing a motor drive torque to rotate said rotatable support means to drive said frame over generally level ground; and
means comprising governor means for varying motor drive torque to maintain a generally constant speed of rotation of the rotatable support means as the frame means is driven under varying load conditions.

9. The apparatus of claim 8 wherein the governor means comprise a plurality of weights movable inwardly and outwardly to vary motor drive torque.

10. A drive apparatus for an irrigation line comprising:
frame means on which an irrigation line is supported;
rotatable support means mounted to said frame means and on which the frame means are supported with the rotatable support means on the ground;
variable speed motor means operatively coupled with said rotatable support means to apply driving torque to said rotatable support means;
means for providing a motor drive torque to rotate said rotatable support means to drive said frame over the ground;
means for selectively determining the maximum motor means speed available; and
means comprising governor means for varying motor drive torque to maintain a generally constant speed of the support means as the frame means is driven over a variation in grade.

11. The apparatus of claim 10 wherein the means for selectively determining the maximum speed of the motor comprise adjustable means operatively associated with said motor means and means for providing a motor drive torque to rotate said rotatable support means.

* * * * *

UNITED STATES PATENT OFFICE
CERTIFICATE OF CORRECTION

Patent No. 4,067,497     Dated January 10, 1978

Inventor(s)  GAIL CORNELIUS

It is certified that error appears in the above-identified patent and that said Letters Patent are hereby corrected as shown below:

In column 2, line 29, reference "13" should read --14--.

In the drawings, sheet 4, Fig. 3, should be amended (per attachment) to include line IV - IV.

Signed and Sealed this

Third Day of April 1979

[SEAL]

Attest:

RUTH C. MASON
Attesting Officer

DONALD W. BANNER
Commissioner of Patents and Trademarks

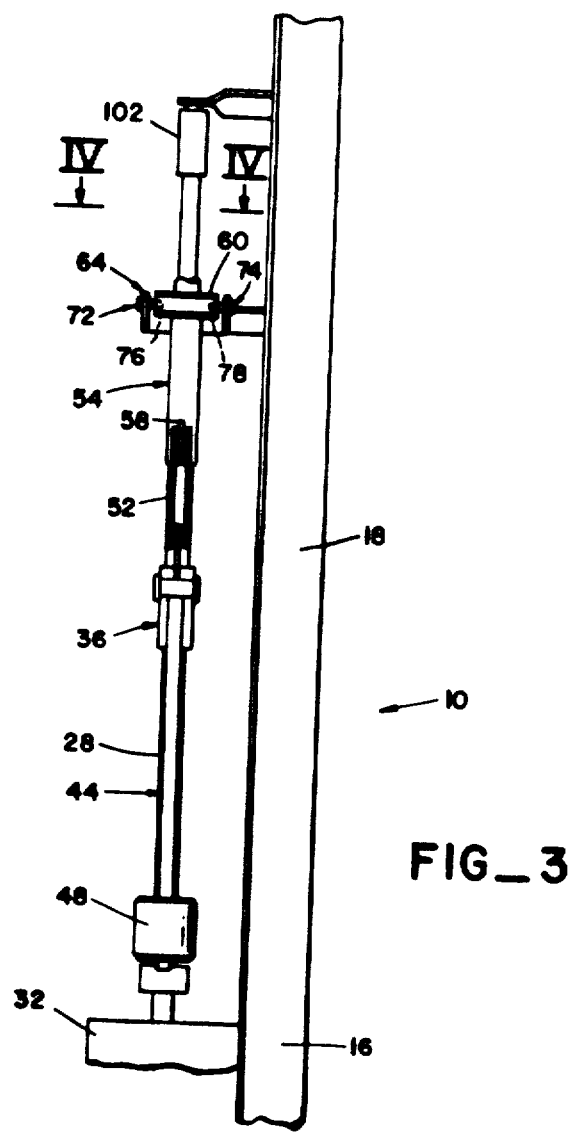
FIG_3